3,321,454
HALOGENATED NITROSO TERPOLYMERS CONSISTING OF NITROSOALKANES, FLUORINE-CONTAINING MONOOLEFINS, AND ALIPHATIC NITROSO MONOCARBOXYLIC ACIDS
George H. Crawford, Jr., Dellwood, White Bear Lake, and David E. Rice, Minneapolis, Minn., assignors to Minnesota Mining and Manufacturing Company, St. Paul, Minn., a corporation of Delaware
No Drawing. Filed May 3, 1963, Ser. No. 277,717
9 Claims. (Cl. 260—92.1)

This invention relates to new and useful fluorine-containing polymers, essentially linear in structure, having improved properties and to a method for the preparation thereof. In one aspect this invention relates to new and vulcanizable high molecular weight fluorine-containing thermoplastics and elastomers. In another aspect this invention relates to a new carboxyl containing rubber useful for coating surfaces and fabrics to be used under corrosive conditions.

Solid copolymers of fluorine-containing nitrosoalkane and perfluorinated olefins are known in the prior art. These copolymers are elastomeric or plastic in nature and have many uses particularly in severe environments because the copolymers combine resistance to chemical and solvent attack with low temperature serviceability. The elastomers may be vulcanized or cross-linked to yield materials of increased hardness and stiffness. It is desirable in most instances when the elastomer is being utilized in a molded article to vulcanize or cross-link the elastomer during molding. Of the above copolymers the perfluorinated elastomers are most useful as articles of manufacture for use under extreme conditions of temperature, etc. However cross-linking of these perfluorinated nitroso polymers is very difficult since there are no cross-linking sites, in the conventional sense, available. It is, therefore, much to be desired to provide a nitroso polymer having the above properties but including therein cross-linking sites to enable cross-linking of the polymer.

It is an object of this invention to provide new and useful fluorine-containing polymers which are readily cross-linkable.

It is another object of this invention to provide a process for the production of vulcanizable solid essentially linear polymers.

Another object of this invention is to provide new fluorine-containing linear polymers which can be fabricated into various useful objects and articles of manufacture.

Another object of this invention is to provide an elastomeric or rubbery high molecular weight linear polymer containing fluorine which is completely soluble in fluorine-containing halocarbons and which can be vulcanized.

Still another object of this invention is to provide a vulcanized fluorine-containing elastomer.

Various other objects and advantages of the present invention will become apparent to those skilled in the art from the accompanying description and disclosure.

According to the present invention, an ethylenically unsaturated aliphatic monoolefin containing fluorine is copolymerized with a halogenated nitroso mono carboxylic acid at a substantially constant temperature to produce directly a high molecular weight, solid, essentially linear polymer. To control the number of carboxyl groups in the final polymer, a fluorine-containing nitrosoalkane is substituted for part of the nitroso carboxylic acid. The solid linear polymer of the present invention has an average molecular weight above 100,000 and as high as 1,000,000 to 2,000,000 or higher. The polymer of the present invention is either a thermoplastic or elastomeric material depending upon the conditions of polymerization and the monomers employed. Both the perhalogenated elastomeric polymer and thermoplastic polymer are insoluble in hydrocarbon solvents but the perhalogenated elastomer is completely soluble in the uncrosslinked form in perfluorinated hydrocarbons. The perhalogenated polymers of this invention are thermally stable up to about 250° C. In the case of the terpolymer, the proportion of the monomeric units in the final polymer is usually in a mole ratio of nitroso monomers to olefin of 1:1 and the mole ratio of nitroso alkane to nitroso carboxylic acid is preferably about 1:0.01 to 1:0.2.

The first component of the polymerizaiton system is a nitroso aliphatic mono carboxylic acid. Preferably these carboxylic acids are saturated and perhalogenated in which the halogens are chlorine or fluorine. Useful carboxylic acids include the omega nitroso saturated perfluorocarboxylic acids such as omega nitroso perfluorobutyric acid, omega nitroso perfluorovaleric acid and omega nitroso perfluorononanoic acid. In general the nitroso carboxylic acids of this invention contain from 2 to 10 carbon atoms per molecule. The nitroso carboxylic acids are prepared by reacting an aliphatic anhydride of a dicarboxylic acid containing halogen substitution with nitrogen sesquioxide to produce the corresponding halogen containing acyl dinitrite. The acyl dinitrite is then mono-decarboxylated and hydrolyzed to produce the corresponding nitroso aliphatic carboxylic acid. The preparation of such carboxylic acids and the conditions of their preparation are disclosed in prior and copending application S. N. 227,839 filed Oct. 2, 1962 in the names of George H. Crawford, Jr., David E. Rice and Dean R. Yarian, now Patent No. 3,192,247.

The second comonomer with which the nitroso carboxylic acid of this invention is copolymerized is a polymerizable aliphatic monoolefin having only ethylenic unsaturation and not more than eight carbon atoms per molecule. The aliphatic monoolefin comonomers are preferably those which will homopolymerize by free radical mechanism. Preferably, the monoolefins have at least two halogen atoms such as chlorine or fluorine per molecule, at least two of which are fluorine, and not more than three hydrogen atoms per molecule. Examples of the preferred fluorine-containing monoolefins include trifluoroethylene, difluoromonochloroethylene, tetrafluoroethylene, trifluorochloroethylene and unsymmetrical difluorodichloroethylene. Other monoolefin comonomers which will copolymerize with the nitrosoalkane include vinylidene chloride, vinylidene fluoride, perfluoropropene, styrene and the acrylates in which the carbons of the double bond bear halogens.

The fluorine-containing mono nitroso alkane monomeric material of the present invention which is used as the third component is perhalogenated in which the halogens are normally gaseous halogens and preferably the nitrosoalkane contains less than thirteen carbon atoms per molecule. Nitrosoalkanes of greater number of carbon atoms can be made and used as monomers without departing from the scope of this invention. Typical examples of the fluorine-containing mono nitrosoalkanes of the present invention include trifluoronitrosomethane, pentafluoronitrosomethane, heptafluoronitrosopropane, nitrosoperfluorobutane, nitrosoperfluorooctane, trifluorodichloronitrosomethane, 1 - nitroso-1,3,5,7,7,7-hexachlorononafluoroheptane, and 1-nitroso - 1,3,5,7,9,9,9 - heptachlorododecafluorononane.

The mononitrosoalkanes are prepared by reacting a fluorine-containing alkyl halide of less than thirteen carbon atoms, such as an alkyl bromide or an alkyl iodide, with nitric oxide in approximately equal molar ratios in the presence of mercury and ultraviolet light for about 24 hours to produce the corresponding nitrosoalkane.

A convenient empirical formula for representing the mononitroso alkane is R—NO where R is a halogenated alkyl radical containing fluorine on the carbon atom adjacent to the nitroso group, in which the other halogens are selected from the group consisting of chlorine and fluorine. Preferably, the alkyl radical is perhalogenated and has not more than six carbon atoms.

Various polymerization techniques may be utilized to copolymerize the monomers of the present invention to produce solid polymers. Accordingly, the polymerization may be carried out as a bulk polymerization in which the monomers are polymerized in an enclosed glass or metal reactor under autogenous pressure at temperatures below 10° C., preferably below 0° C. for a period of time of at least one-half hour to obtain about 90 percent conversion to the solid polymer. Temperatures much above 25° C. in the bulk system result in low molecular weight waxy or oily product.

The solid polymer also can be produced by the use of an aqueous emulsion technique in which the monomers are emulsified in water during polymerization. It is important, however, in the emulsion technique that the emulsifier is substantially inert and does not act as a chain transfer agent.

The proportion of the reactants, nitrosoalkane to olefin to nitroso carboxylic acid, in the reaction mixture is usually in a mol ratio of about 1:0.5:0.01 to about 1:1.5:0.2. The preferred mol ratio of the nitroso-containing monomers to the monoolefin, is about 1:1, and the mol ratio of these reactants in the final product is approximately the same. In any event, sufficient carboxylic acid monomer should be used to assure at least three free carboxyl groups per polymer molecule.

The terpolymer may be represented by the following linear structure which has been substantiated by chemical analysis and nuclear magnetic resonance determination:

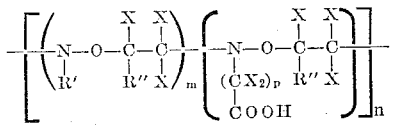

in which R′ is the alkyl group of the nitrosoalkane and previously defined, and R″ is an alkyl group derived from the monoolefin or halogen or hydrogen; X is a halogen or hydrogen, and preferably X is fluorine or chlorine; $m$ is 0 to 500; $p$ is 1 to 9; and $n$ is generally 250 to 1,000.

The solid high molecular weight terpolymers of the present invention are useful as sealants, adhesives and surface coatings such as for metal and glass surfaces. The polymer of the present invention can be coated on various surfaces directly from the latex produced in an emulsion system or the separated and dried polymer can be dissolved in a fluorocarbon or chlorofluorocarbon solvent and then coated on the surface.

The solid rubbery terpolymers of this invention may be reformed at temperatures above 50° C. into various articles, such as gaskets and O-rings; and vulcanized to produce stiffer and harder articles. The elastomer of this invention may be vulcanized with conventional vulcanization or cross-linking agents under conventional vulcanization conditions. Examples of suitable cross-linking agents include the basic metal oxides and hydroxides, such as the metals magnesium, cadmium, manganese, calcium, zinc and strontium, the polyhydric alcohols such as ethylene gylcol and the diepoxides such as the digylcidyl ether or a bis-phenol.

The following examples are offered as a better understanding of the various aspects of this invention and should not be construed as limiting the invention.

EXAMPLE I

Approximately 10 grams of $N_2O_3$ were condensed into a flask at Dry Ice temperature and 16 grams of perfluorosuccinic acid anhydride, previously cooled to 0° C., were added. The flask was connected to a Dry Ice reflux condenser and placed in an ice-salt bath at −5° C. After a few minutes, the reaction mixture had become lighter in color and a precipitate had started to form. After two hours, the reaction mixture consisted of a yellow solid perfluoro succinyl dinitrite, which was dried for eight hours under vacuum at room temperature. The yield was 17.5 grams. The material quickly formed perfluorosuccinic acid upon exposure to moisture of the atmosphere, or reacted rapidly with water, and melted at 44–48° C.

*Analysis.*—Calc'd for $C_4F_4N_2O_6$: C, 19.4; F, 30.7; N, 11.3. Found: C, 19.6; F, 31.7; N, 10.5.

The NMR spectrum showed a single peak at $$\phi^{*14} = 126.0$$

About 10 grams of perfluoro succinyl dinitrite

was placed in a 250 cc. flask and connected through carbon dioxide-acetone and liquid nitrogen traps to a vacuum pump, used to maintain a pressure of ~1 mm. throughout the system. The reaction flask was then subject to ultra violet irradiation (lamp ~6″ from flask). After reaction, water (50 cc.) was added to the carbon dioxide-acetone trap to convert the

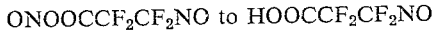

The aqueous solution was then extracted with ether and the ether evaporated to obtain omega nitroso perfluoro propionic acid ($HOOCCF_2CF_2NO$).

EXAMPLE II $N_2O_3$ (~12 grams, 0.16 moles) was condensed into a 100 cc. flask at −78° C. and perfluoroglutaric acid anhydride (17 grams, .077 moles) added all at once. The flask was then kept at 0° C. for one hour, allowed to warm to room temperature and the excess $N_2O_3$ removed under reduced pressure. The viscous liquid was then cooled to liquid nitrogen temperature at a pressure of 1–2 mm., causing crystallization to occur. The product, perfluoroglutaryl dinitrite, was obtained as a yellow solid, (22 grams, 74% yield), M.P. 45–53° C.

About 13 grams of finely powdered perfluoroglutaryl dinitrite was placed in a 500 cc. Pyrex flask cooled by a current of air and connected to Dry Ice-acetone and liquid nitrogen traps and then to a vacuum pump. The flask was irradiated for a period of 18 hours by means of a sunlamp positioned 6″ directly below the flask, while maintaining a pressure of 1–2 mm. throughout the system. At the end of this time the residue in the flask consisted of a small amount of unreacted dinitrite plus 4–5 grams of a polymeric material. The product in the Dry Ice trap was treated with 50 cc. water and extracted with ether. The ether extracts from three of these runs were dried over sodium sulfate and the ether distilled off at aspirator pressure. The residue was distilled at 1–2 mm. yielding 5.5 grams (19% yield) of a deep blue liquid boiling from 26–40° C. The product was identified as omega perfluorobutyric acid ($ON(CF_2)_3COOH$). The pot residue consisted mainly of perfluoroglutaric acid.

EXAMPLE III

A 30 cc. glass ampoule was charged with 1.5 grams $HOOCCF_2CF_2NO$, cooled to liquid nitrogen temperature and 5.1 grams $CF_3NO$ and 5.7 grams $C_2F_4$ condensed in. The ampoule was sealed, warmed to −78° C., shaken briefly to obtain a homogeneous solution and then allowed to stand at −30° C. for three days. The product was a tacky elastomeric material similar in appearance to samples of low MW $CF_3NO/C_2F_4$ copolymer. The polymer was soluble in $CF_2ClCFCl_2$ and perfluorocarbons and insoluble in water, methanol and acetone. The IR and NMR spectra were consistent for a terpolymer of $CF_3NO/C_2F_4/COOCCF_2CF_2NO$. The $T_g$ was found to be −33° C. The Neutralization Equivalent and C, F, N, analyses indicated the following structure:

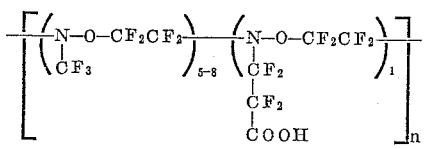

When a solution of 0.5 gram of the above terpolymer in 10 cc. $CF_2ClCFCl_2$ was treated with 0.5 cc. of a saturated $Ba(OH)_2$ solution, gel formation occurred instantly. The gel, after drying, exhibited no cold flow and could not be dissolved in $CF_2ClCFCl_2$ indicating crosslinking had occurred.

EXAMPLE IV

The omega nitrosoperfluorocarboxylic acid was charged into a 60 cc. Pyrex ampoule at room temperature and the ampoule was then cooled to liquid nitrogen temperature and the gaseous monomers ($CF_3NO$ and $C_2F_4$ or $CF_2CFCl$) condensed in under vacuum. The ampoule was then sealed, warmed to $-65°$ C., and shaken until a homogeneous solution resulted. The ampoule was then kept at a desired temperature until it appeared that a high conversion had been reached as evidenced by the viscosity and color of the reaction mixture. The polymer was freed of unreacted monomer by drying under vacuum at 70° C. The conditions of reaction are shown in Table I below. The polymer produced was a high molecular weight elastomer which could be cross-linked readily with basic metal oxides or hydroxides, polyhydric alcohols and epoxides.

3. The polymer of claim 1 in which X is halogen.
4. The polymer of claim 1 in which X is fluorine.
5. A terpolymer of omega nitroso perfluoropropionic acid, trifluoronitroso methane and tetrafluoroethylene, the mol ratio of nitroso monomers to tetrafluoroethylene being about 1:1 and the mol ratio of nitrosoalkane to nitrosocarboxylic acid being about 1:0.01 to 1:0.2 and having a structure as shown in claim 1.
6. A terpolymer of omega nitroso perfluorobutyric acid, trifluoronitroso methane and tetrafluoroethylene, the mol ratio of nitroso monomers to tetrafluoroethylene being about 1:1 and the mol ratio of nitrosoalkane to nitrosocarboxylic acid being about 1:0.01 to 1:0.2 and having a structure as shown in claim 1.
7. A terpolymer of omega nitroso perfluorobutyric acid, trifluoronitroso methane and trifluorochloroethylene, the mol ratio of nitroso monomers to trifluorochloroethylene being about 1:1 and the mol ratio of nitrosoalkane to nitrosocarboxylic acid being about 1:0.01 to 1:0.2 and having a structure as shown in claim 1.
8. A process for producing a halogenated linear carboxyl-containing terpolymer having a molecular weight above 100,000 comprising copolymerizing a fluorine-containing nitrosoalkane, a fluorine-containing ethylenically unsaturated monoolefin of not more than 8 carbon atoms per molecule, and a saturated halogen-containing aliphatic nitroso monocarboxylic acid at a temperature below 10° C. and at a pressure sufficient to maintain a liquid monomer phase, the mol ratio of nitrosoalkane to monoolefin

TABLE I

| Run No. | Monomers | Mole Ratio Charged | Rx. Temp. (° C.) | Rx. Time, days | Conver., Percent |
|---|---|---|---|---|---|
| 1 | $HOOCCF_2CF_2NO/CF_3NO/C_2F_4$ | 1.5/48.5/50 | -65 | 30 | 91 |
| 2 | $HOOCCF_2CF_2CF_2NO/CF_3NO/C_2F_4$ | 0.5/49.5/50 | -65 | 25 | 97 |
| 3 | $HOOCCF_2CF_2CF_2NO/CF_3NO/C_2F_4$ | 1/49/50 | -65 | 25 | 97 |
| 4 | $HOOCCF_2CF_2CF_2NO/CF_3NO/C_2F_4$ | 0.25/49.75/50 | -65 | 25 | 97 |
| 5 | $HOOCCF_2CF_2CF_2NO/CF_3NO/CF_2CFCl$ | 1.5/48.5/50 | -25 | 3 | 85 |

Various quantities of the nitrosoalkane may be used to replace the carboxylic acid in the polymerization to produce a polymer having a predetermined number of free carboxyl groups without departing from the scope of this invention.

What is claimed is:
1. A halogenated linear carboxyl-containing terpolymer having a molecular weight above 100,000 represented by the following structural formula:

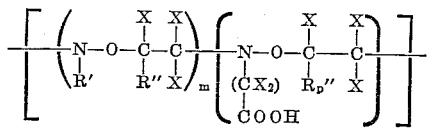

in which R′ is a halogenated alkyl group containing fluorine on the carbon atom adjacent the nitroso group, R″ is an alkyl group, halogen or hydrogen, X is halogen or hydrogen, $m$ is 1 to 500 and $p$ is 1 to 9.
2. The polymer of claim 1 which has been crosslinked with a crosslinking agent consisting of the group of a basic metal oxide, a basic metal hydroxide and a polyhydric alcohol and a diepoxide.

to nitroso monocarboxylic acid being between about 1:0.5:0.01 and about 1:1.5:0.2.
9. A process for producing a halogenated linear carboxyl-containing terpolymer having a molecular weight above 100,000 comprising copolymerizing a fluorine-containing nitrosoalkane, a fluorine-containing ethylenically unsaturated monoolefin having at least 2 fluorine atoms and not more than 8 carbon atoms per molecule, and a saturated perhalogenated aliphatic nitroso monocarboxylic acid having from 2 to 10 carbon atoms per molecule below 10° C. at a sufficient pressure to maintain a liquid monomer phase, the mol ratio of nitrosoalkane to monoolefin to nitroso monocarboxylic acid being between about 1:0.5:0.01 and about 1:1.5:0.2.

References Cited by the Examiner

UNITED STATES PATENTS 3,192,247  6/1965  Crawford et al. _____ 260—466

JOSEPH L. SCHOFER, Primary Examiner.

J. A. SEIDLECK, J. A. DONAHUE, Assistant Examiners.

UNITED STATES PATENT OFFICE
CERTIFICATE OF CORRECTION

Patent No. 3,321,454                          May 23, 1967

George H. Crawford, Jr., et al.

It is certified that error appears in the above identified patent and that said Letters Patent are hereby corrected as shown below:

Column 3, line 67, "or" should read -- of --.

Signed and sealed this 11th day of November 1969.

(SEAL)
Attest:

Edward M. Fletcher, Jr.                  WILLIAM E. SCHUYLER, JR.
Attesting Officer                            Commissioner of Patents